US012083513B2

(12) United States Patent
Haghgooie et al.

(10) Patent No.: US 12,083,513 B2
(45) Date of Patent: *Sep. 10, 2024

(54) SPECIMEN ACCEPTANCE DEVICES AND ATTACHABLE DISPOSABLE ASSAY CARTRIDGES

(71) Applicant: The General Hospital Corporation, Boston, MA (US)

(72) Inventors: Ramin Haghgooie, Arlington, MA (US); Robert Granier, Boston, MA (US); Kenneth T. Kotz, Auburndale, MA (US); Anne C. Petrofsky, Sudbury, MA (US)

(73) Assignee: The General Hospital Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,432

(22) Filed: Jun. 6, 2019

(65) Prior Publication Data

US 2020/0122141 A1 Apr. 23, 2020

Related U.S. Application Data

(63) Continuation of application No. 14/884,488, filed on Oct. 15, 2015, now Pat. No. 10,335,787.

(60) Provisional application No. 62/064,846, filed on Oct. 16, 2014.

(51) Int. Cl.
*B01L 3/00* (2006.01)

(52) U.S. Cl.
CPC ... *B01L 3/502715* (2013.01); *B01L 2200/027* (2013.01); *B01L 2200/028* (2013.01); *B01L 2200/0631* (2013.01); *B01L 2200/10* (2013.01); *B01L 2200/16* (2013.01); *B01L 2300/044* (2013.01); *B01L 2300/046* (2013.01); *B01L 2300/0672* (2013.01); *B01L 2300/0681* (2013.01); *B01L 2300/0864* (2013.01); *B01L 2300/0867* (2013.01); *B01L 2300/0874* (2013.01); *B01L 2300/0887* (2013.01); *B01L 2400/0478* (2013.01)

(58) Field of Classification Search
CPC ............ B01L 3/5027; B01L 3/502707; B01L 3/502715; B01L 3/502723; B01L 2200/10; B01L 2200/028; B01L 2300/0867
See application file for complete search history.

(56) References Cited

U.S. PATENT DOCUMENTS 6,251,343 B1 6/2001 Dubrow
6,485,690 B1 11/2002 Pfost
(Continued)

FOREIGN PATENT DOCUMENTS

WO WO 2015/065909 5/2015
WO WO 2017/165630 9/2017

*Primary Examiner* — Jill A Warden
*Assistant Examiner* — Dwayne K Handy
(74) *Attorney, Agent, or Firm* — Fish & Richardson P.C.

(57) ABSTRACT

An apparatus includes a device for storing a liquid sample, in which the device has a sample acceptance well, one or more storage chambers, and one or more fluidic channels fluidly coupling the sample acceptance well to the one or more storage chambers. The apparatus also includes a well plate having a plate and multiple wells formed in the plate, in which the device and the well plate are configured to be attached to one another.

25 Claims, 14 Drawing Sheets

(56) References Cited

U.S. PATENT DOCUMENTS

| | | | | |
|---|---|---|---|---|
| 6,495,104 | B1 * | 12/2002 | Unno | B01L 3/5027 204/601 |
| 8,380,541 | B1 | 2/2013 | Holmes | |
| 8,435,738 | B2 | 5/2013 | Holmes | |
| 10,335,787 | B2 * | 7/2019 | Haghgooie | B01L 3/502715 |
| 2002/0047003 | A1 * | 4/2002 | Bedingham | B01L 3/50273 219/388 |
| 2002/0068357 | A1 | 6/2002 | Mathies | |
| 2004/0033168 | A1 | 2/2004 | Hughes | |
| 2004/0219074 | A1 * | 11/2004 | Childers | B01L 3/5085 422/534 |
| 2013/0210127 | A1 * | 8/2013 | Williams | B01L 7/52 435/287.2 |
| 2015/0285731 | A1 | 10/2015 | Haghgooie et al. | |

* cited by examiner

SPECIMEN ACCEPTANCE DEVICES AND ATTACHABLE DISPOSABLE ASSAY CARTRIDGES

CROSS-REFERENCE TO RELATED APPLICATIONS

The application is a continuation of U.S. application Ser. No. 14/884,488, filed Oct. 15, 2015, which claims the benefit of U.S. Provisional Application No. 62/064,846, filed Oct. 16, 2014, the entire contents of which are incorporated herein by reference.

STATEMENT OF FEDERALLY SPONSORED RESEARCH

This invention was made with government support under GM021700 awarded by the National Institutes of Health. The government has certain rights in the invention.

TECHNICAL FIELD

The present disclosure relates to specimen acceptance devices and attachable disposable assay cartridges.

BACKGROUND

In typical hospital central lab settings, performing a panel (or panels) of assays for the treatment of a patient may require several different types of blood samples. For instance, these samples may include anti-coagulated blood (Heparin, EDTA, or Citrate), serum or plasma. In one example, performing a complete blood count (CBC) and a chemistry panel may require at least two different 3-5 mL tubes of blood. Moreover, current point-of-care systems may have a number of drawbacks that preclude such systems from substantially reducing costs and time associated with performing panels of assays. For example, such systems may have limited assay menus, may require multiple analyzers, may provide relatively poor analytical quality, may require manual sample preparation, may need dedicated personnel to operate, and may have substantial equipment costs.

SUMMARY

The subject matter disclosed herein covers enhancing the analysis of specimens (e.g., blood, urine, or saliva) from a patient by providing apparatuses and methods for storing the specimen samples, for storing the necessary reagents for particular assay panels, and for providing a vessel for mixing/reacting the stored samples with reagents prior to analysis. In particular, the apparatuses include a sample acceptance device into which a single patient specimen (e.g., blood) is introduced and stored, and one or more disposable assay cartridges to which the sample acceptance device can be attached. Portions of the specimen from the acceptance device can then be transferred to one or more wells of the disposable assay cartridge for performing reactions and analyses, depending on the particular panel of assays to be performed.

In general, in one aspect, the subject matter of the present disclosure can be embodied in an apparatus that includes a device for storing a liquid sample, in which the device includes a sample acceptance well, one or more storage chambers, and one or more fluidic channels fluidly coupling the sample acceptance well to the one or more storage chambers. The apparatus further includes a well-plate including a plate and multiple wells formed in the plate, in which the device and the well plate are configured to be attached to one another.

Embodiments can include one or more of the following features. For example, in some embodiments, at least one of the fluidic channels of the device includes a filter.

In some embodiments, at least one of the storage chambers includes a reagent. The reagent can be an anti-coagulant.

In some embodiments, the device includes a pneumatic actuation device configured to modify air pressure within the sample acceptance well. The pneumatic actuation device can be a plunger.

In some embodiments, the device includes a re-sealable septum that seals the sample acceptance well.

In some embodiments, the device includes a needle fluidly coupled to the sample acceptance well, in which the needle extends from a first surface of the device. The device can include a wall protruding from the first surface of the device, in which the wall surrounds the needle.

In some embodiments, the device includes one or more hydrophobic membranes arranged adjacent to the one or more chambers, in which each hydrophobic membrane is configured to allow gases but not liquids to pass through the membrane.

In some embodiments, the well plate includes a receptacle region for receiving the device. The device can be adapted to lock into place within the receptacle region. The receptacle region can include a first interlocking element and the device can include a second interlocking element configured to join with the first interlocking element such that the device is fixed in the receptacle region.

In some embodiments, at least one of the wells includes a reagent.

In some embodiments, the multiple wells include reagents for performing a predetermined assay panel. The predetermined assay panel can include one or more of a complete blood count (CBC) assay, a basic metabolic panel (BMP) assay, a comprehensive metabolic panel (CMP) assay, a hepatic assay, an amylase/lipase assay, a cardiac assay, and a toxicology assay.

In some embodiments, the well-plate includes multiple smaller individual well-plates, in which each individual well-plate includes multiple wells and is configured to be attached to another individual well-plate and/or the device. Each individual well-plate can include a first interlocking element configured to join with the second interlocking element on a different individual well-plate such that two individual well-plates are fixed together when the first interlocking element and the second interlocking element join. Each individual well-plate can include reagents for performing a predetermined assay panel.

In general, in another aspect, the subject matter of the present disclosure can be embodied in a device for storing a liquid sample, in which the device includes a sample acceptance well, one or more storage chambers, and one or more fluidic channels fluidly coupling the sample acceptance well to the one or more storage chambers, in which the device is configured to be attached to a well-plate.

Embodiments can include one or more of the following features. For example, in some embodiments, at least one of the fluidic channels of the device includes a filter.

In some embodiments, at least one of the storage chambers includes a reagent. The reagent can be an anti-coagulant.

In some embodiments, the device includes a pneumatic actuation device configured to modify air pressure within the sample acceptance well.

In some embodiments, the pneumatic actuation device is a plunger.

In some embodiments, the device includes a re-sealable septum that seals the sample acceptance well.

In some embodiments, the device includes a needle fluidly coupled to the sample acceptance well, in which the needle extends from a first surface of the device. The device can include a wall protruding from the first surface of the device, in which the wall surrounds the needle.

In some embodiments, the device includes one or more hydrophobic membranes arranged adjacent to the one or more chambers, in which each hydrophobic membrane is configured to allow gases but not liquids to pass through the membrane.

In general, in another aspect, the subject matter of the present disclosure can be embodied in a well-plate that includes a plate, multiple wells formed in the plate, and a receptacle region configured to attach to a separate fluid sample storage device.

Embodiments can include one or more of the following features. For example, in some embodiments, the receptacle region is adapted to form a lock with the device. The receptacle region can include a first interlocking element configured to join with a second interlocking element on the storage device such that the device is fixed in the receptacle region.

In some embodiments, at least one of the wells includes a reagent.

In some embodiments, the multiple wells include reagents for performing a predetermined assay panel. The predetermined assay panel can include one or more of a complete blood count (CBC) assay, a basic metabolic panel (BMP) assay, a comprehensive metabolic panel (CMP) assay, a hepatic assay, an amylase/lipase assay, a cardiac assay, and a toxicology assay. The predetermined assay panel is not limited to those listed here and can include any hematology, chemistry, and/or immunoassay panel.

In some embodiments, the well-plate includes multiple smaller individual well-plates, in which each individual well-plate includes multiple wells and is configured to be attached to another individual well-plate and/or the device. Each individual well-plate can include a first interlocking element configured to join with a second interlocking element on a different individual well-plate such that two individual well-plates are fixed together when the first interlocking element and the second interlocking element join. Each individual well-plate can include reagents for performing a predetermined assay panel.

In general, in another aspect, the subject matter of the present disclosure can be embodied in a method for performing analysis of a liquid sample, in which the method includes loading the liquid sample into a sample acceptance well of a device, causing the liquid sample to flow through one or more fluidic channels into one or more storage chambers of the device from the sample acceptance well, and attaching the device to a well plate including a plate and multiple wells formed in the plate. The method may further include transferring the liquid sample from the one or more storage chambers to one or more of the wells of the well-plate, and analyzing one or more chemical reactions that occur in the one or more wells of the well-plate subsequent to transferring the liquid sample.

Embodiments can include one or more of the following features. For example, in some embodiments, the method further includes transferring the liquid sample from the one or more storage chambers to one or more of the wells of the well-plate. The method can further include analyzing one or more chemical reactions that occur in the one or more wells of the well-plate subsequent to transferring the liquid sample.

In some embodiments, the one or more storage chambers of the device are pre-loaded with a reagent. The reagent can include an anti-coagulant.

In some embodiments, the liquid sample is a blood sample.

In some embodiments, the one or more wells of the well-plate are pre-loaded with a reagent.

In some embodiments, the method further includes filtering the liquid sample in the one or more fluidic channels of the device.

Advantages of the apparatuses, systems, devices, methods, and techniques disclosed herein in point of care testing can include, for example, the use of low-cost disposable cartridges for performing assay panels, a reduction in the volume of a sample required (e.g., eliminating the need for obtaining blood samples in multiple different vials) for analysis, the ability to perform integrated blood preparation using a single specimen sample, the ability to keep specimen samples stable and secure to minimize exposure, yet also accessible, for a relatively long period of time, and/or the amenability of the design to low-cost/high volume manufacturing processes.

For the purposes of this disclosure, "reagent" refers to a substance or mixture for use in chemical analysis or other reactions.

For the purposes of this disclosure, "microfluidic" refers to a fluidic system, device, channel, or chamber that generally have at least one cross-sectional dimension in the range of about 10 nm to about 10 mm.

For the purposes of this disclosure, "fluidic channel" refers to a structure in which a fluid may flow.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods and examples are illustrative only and not intended to be limiting.

Other features and advantages will be apparent from the following detailed description, the figures and from the claims.

DETAILED DESCRIPTION

Figure 1A:
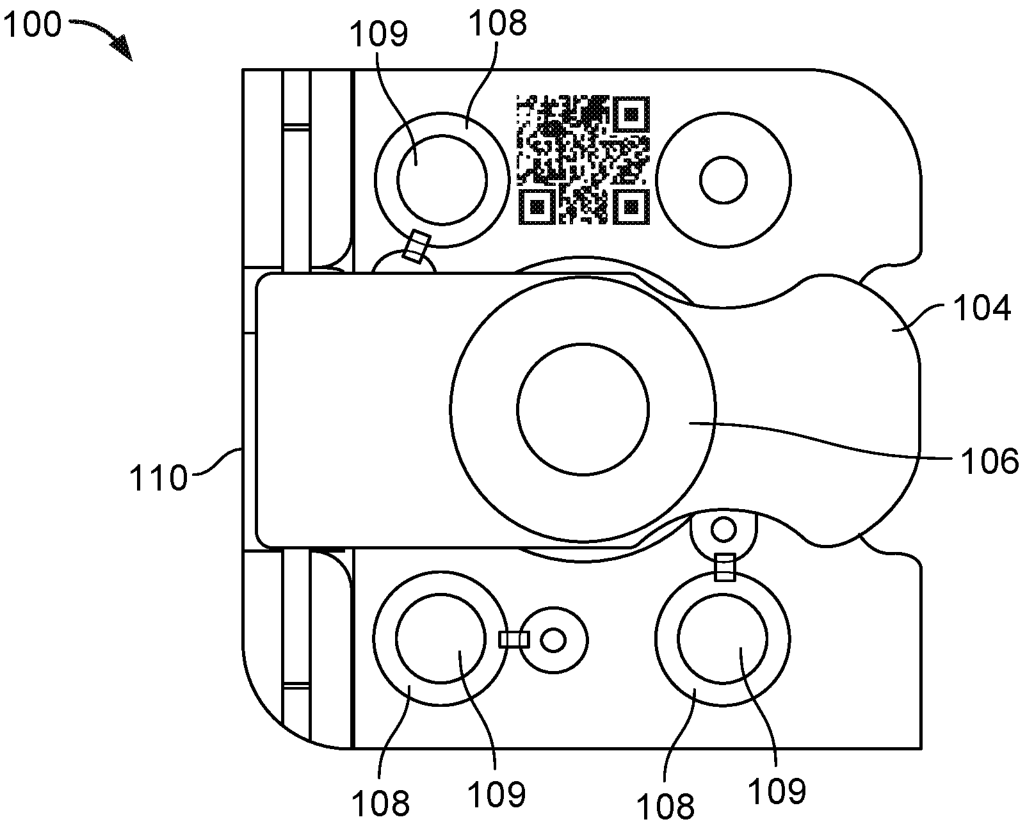
FIG. 1A is a schematic that illustrates a top view of an example of a sample acceptance device.
Figure 1B:
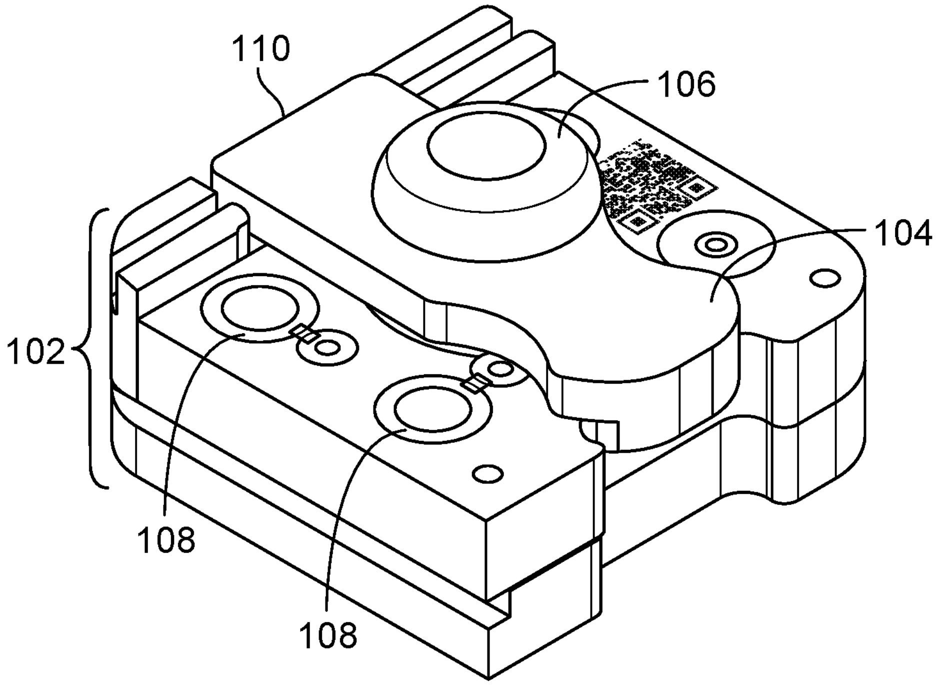
FIG. 1B is a schematic that illustrates a perspective view of the same device 100 shown in FIG. 1A.

FIG. 1A is a schematic that illustrates a top view of an example of a sample acceptance device 100. FIG. 1B is a schematic that illustrates a perspective view of the same device 100 shown in FIG. 1A. The device 100 is configured to receive a specimen sample, such as blood, to apportion the received sample into one or more sub-samples, and to store the sub-samples until they are retrieved for later use in a disposable assay cartridge (described in more detail below). In some implementations, the device 100 also is configured to filter one or more of the sub-samples prior to storing them.

As shown in the example of FIGS. 1A and 1B, the device 100 includes a main body portion 102, a lid 104 coupled to the main body portion 102, a plunger 106 attached to the lid 102, and one or more sample chambers 108 formed in the main body portion 102 for storing the apportioned specimen samples. In some implementations, the lid 104 covers a main sample collection well into which a specimen sample is delivered and which is formed in the main body portion 102. The lid 104 can be coupled to the main body portion 102 of the device 100 by a hinge 110 located at a back side of the device 100 so that the lid can be raised and lowered over the main sample collection well. The plunger 106 is a pneumatic actuation device that, when depressed, increases the pressure within the device 100 (e.g., within the main sample collection well) and when retracted, reduces the pressure or creates a low pressure vacuum within the device (e.g., within the main sample collection well). Additionally, the top of each sample chamber 108 is sealed with a seal 109 (e.g., foil, removable seal) so that the sample(s) contained within sample chambers 108 remain isolated (e.g., to avoid contamination and/or leakage from the device) until it is time for testing. To retrieve the sample stored in the chambers 108, the seal 109 (e.g., foil) may be pierced with a needle or pipette tip.

Figure 2:
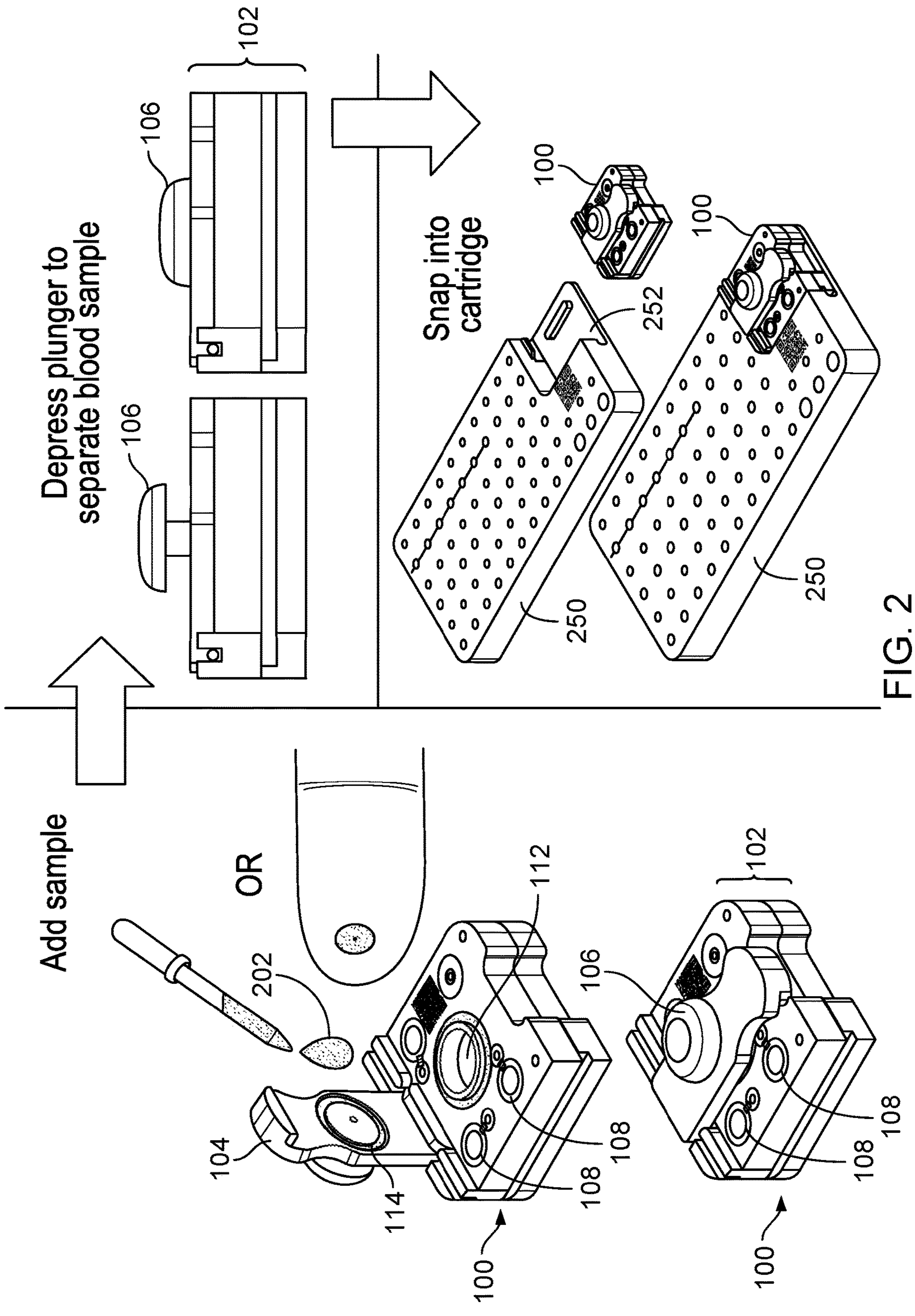
FIG. 2 is a schematic that illustrates an embodiment of how a sample acceptance device is used.

FIG. 2 is a schematic that illustrates an embodiment of the device 100 and how the device 100 may be used. First, a specimen sample (e.g., blood) 202 is acquired from a patient. The sample may be acquired from the patient according to any one of standard sample acquisition techniques including, for example, traditional venipuncture or finger stick. As shown in FIG. 2, the lid 104 of the device is opened to provide access to the main sample collection well 112. The main sample collection well 112 then is filled with the recently acquired specimen sample 202, after which the lid 104 of the device 100 is closed. In some implementations, the bottom side of the lid 104 includes a seal 114 (e.g., an O-ring) that provides a secure seal around the main sample collection well 112 once the lid 104 is closed. In some implementations, the device 100 may also include a locking mechanism (e.g., a latch, such as a spring latch) to keep the lid closed against the main body portion 102. Alternatively, or in addition, the friction provided by the seal 114 over a protruding edge of the main sample collection well 112 may help secure the lid 104 to the main body portion 104. Other locking mechanisms can be used as well.

Once the specimen sample has been loaded into the main sample collection well 112 and the lid 104 of the device 100 is closed, the plunger 106 is depressed. The main sample collection well 112 is fluidly coupled to the one or more sample chambers 108 using microfluidic channels formed in the interior of the main body portion 102. Accordingly, as the plunger is depressed (see FIG. 2, top right corner), the force of the plunger increases the pressure within the well 112 to push fluid out from the main collection well 112, into the microfluidic channels, and then into the sub-chambers 108. In some implementations, one or more of the sample chambers 108 are pre-loaded with an anti-coagulant (e.g., for keeping blood stable just as in the case of a Vacutainer®), a clot activator and/or other reagent. For instance, the sample chambers 108 of the device 100 may be pre-loaded with ethylene diamine tetra acetic acid (EDTA) (e.g., liquid $K_3EDTA$, spray coated $K_2EDTA$), heparin (e.g., sodium heparin, lithium heparin), citrate, or thrombin-based clot activators, among others. Thus, the device 100 may include different sample chambers for different purposes, such as a sample chamber for storing EDTA reacted blood, a separate sample chamber for storing heparin reacted blood, and a separate sample chamber for storing blood plasma.

In some implementations, the specimen sample is filtered before it enters the sample chamber 108. For example, the microfluidic channels of the device 100 that are coupled to the main well 112 may deliver the specimen sample to a filter (e.g., membrane or a gel) prior to reaching the sample chamber 108. As the specimen passes through the filter component, the desired portion of the specimen (e.g., plasma or serum) is separated and passed onto the sub-chamber 108 while the undesired portion of the specimen is held in the filter or redirected to a waste chamber. Example gels include serum separator or plasma separator available from Becton Dickinson. These gels form physical barriers between the serum or plasma and blood cells.

The divided specimen samples then are stored in the sample chambers 108 for a period of time. For instance, if kept in an environment set at about room temperature (i.e., between about 20 and 26° C.), blood samples may be stored in the sub-chambers 108 for up to about ½ hour before changes in hematologic parameters make the sample unusable for further analysis and processing. In some implementations, however, the storage time may be extended beyond ½ hour, for instance up to 12 hours, 24 hours, or even 48 hours using refrigeration of the device.

When it is time for analyzing the specimen samples, the device 100 can be secured to a disposable assay cartridge 250. The cartridge 250 may include a receptacle region 252 for receiving the sample acquisition device 100. In some implementations, the receptacle region 252 and device 100 are designed so that the device 100 snaps into place on the receptacle region 252 and is held securely to the cartridge 250. For instance, the receptacle region 252 and the device may be formed to have a tongue/groove design in which one or more protrusions (i.e., the tongue) formed on either the receptacle region 252 or the device 100 fits into a corresponding slot or other opening (i.e., the groove) formed in the opposing device 100 or the receptacle region 252, such that the two components (cartridge 250 and device 100) lock in place together (e.g., through friction or the shape of the tongue and groove). The interlocking elements slide into place and can be made secure as the two pieces are positioned together in a similar manner to the tongue/groove locking systems used in laminate flooring.

The cartridge 250 may further include multiple wells that are either empty or pre-loaded with one or more different reagents. After joining together, the disposable cartridge 250 and device 100 then are delivered to an analyzer system where analysis of the specimen samples occurs. For instance, the analyzer may perform chemistry, hematology, or immunoassays on the specimen sample. In particular, portions of the specimen sample are transferred from one or more of the sample chambers 108 to one or more of the wells in the cartridge for performing a reaction with the reagents in the well. The product of the reactions then is investigated by the analyzer system, described in more detail below. In some implementations, the analyzer system can receive the cartridge 250 and the device 100 separately. For instance, the analyzer system can include a receptacle or slot to receive the cartridge 250 and a separate receptacle or slot to receive the device 100.

Figure 3:
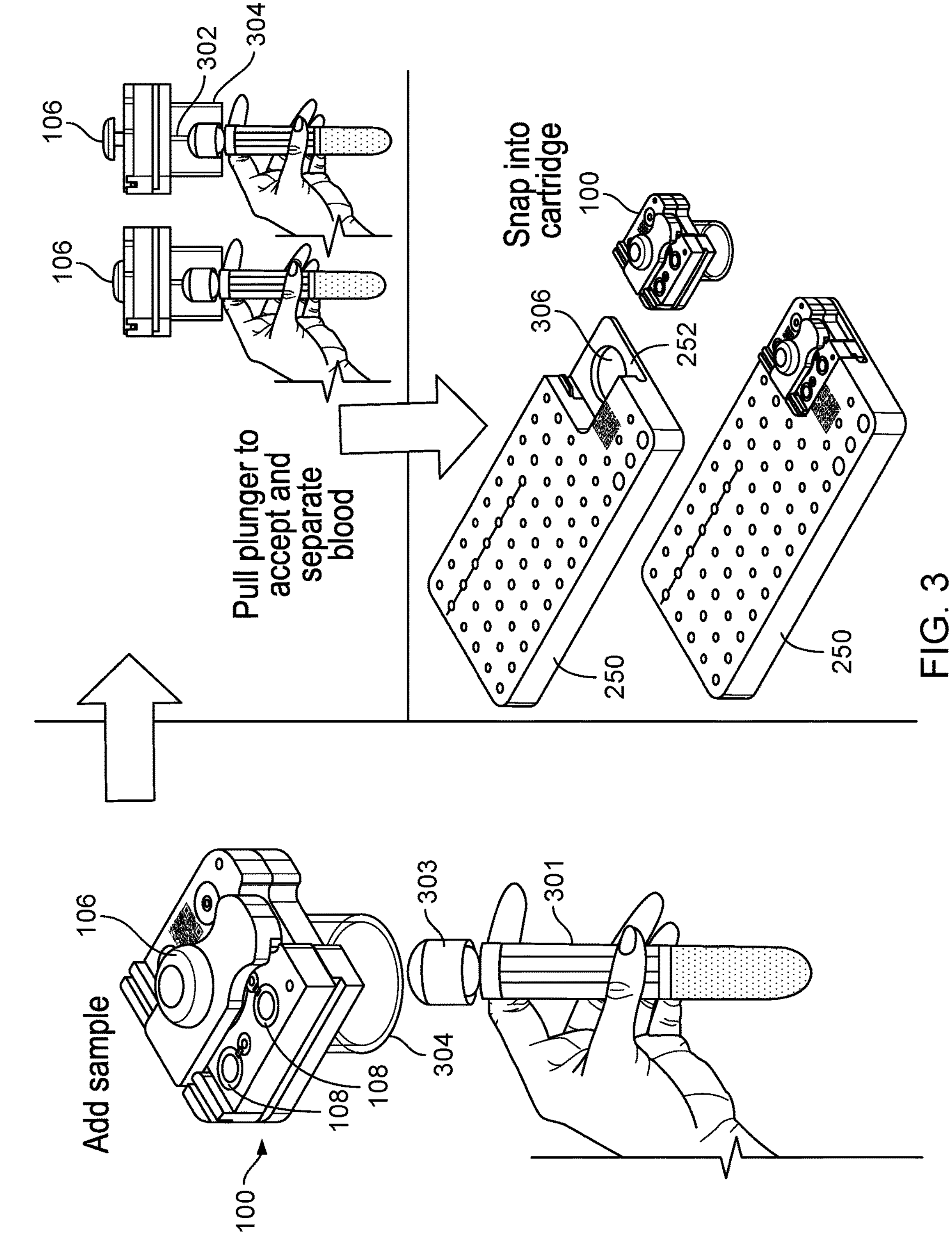
FIG. 3 is a schematic that illustrates an alternative embodiment of how a sample acceptance device is used.

FIG. 3 is a schematic that illustrates another embodiment of the device 100 and how the device 100 may be used. In contrast to the embodiment shown in FIG. 2, the specimen sample is loaded into the device 100 from the bottom. In this case, the device 100 includes a needle 302 surrounded by a needle guard 304 formed on the bottom side of the device 100. In some implementations, a tube or other nozzle may be used in place of the needle 302. The needle 302 fluidly couples to the main sample collection well 112 (not shown in FIG. 3). During use of the device 100, the specimen sample is acquired in a vial or test tube 301 having a conventional stopper 303. The test tube/vial 301 with the stopper 303 is placed under the needle guard 304 such that the needle 302 pierces the stopper 303 to reach the specimen sample. The plunger 106 is raised/retracted to create a low pressure region/vacuum in the main sample collection well 112 so that the specimen sample is drawn into the well 112 of the device 100. As the sample fills the well 112, the sample splits and is drawn into one or more microfluidic channels connected to the sub-chambers 108 of the device 100. Again, the specimen may be separated with a filter, such as gel or a membrane, before entering the sample chambers 108. Also, one or more of the sample chambers 108 may be pre-loaded with reagents such as anti-coagulants, clot activators, and/or other reagents.

When it is time for analyzing the specimen samples stored in the device 100, the device 100 is secured to the disposable assay cartridge 250. Since the device 100 includes the needle guard 304, a hole 306 may be formed in a bottom surface of the receptacle region 252 for receiving the needle guard 304 and holding the device 100 in place on the cartridge 250. Again, the device and cartridge may also include a tongue/groove design for fixing the device 100 to the cartridge 250 in a similar manner as to that described with respect to the embodiment of FIG. 2. For example, the tongue or groove may be formed on one or more sidewalls of the receptacle region 252 so that they are configured and arranged to lock to a corresponding groove or tongue on a sidewall of the device 100.

Other embodiments of the device 100 are also possible. For instance, in some implementations, the specimen samples are delivered to the sample chambers 108 using centrifugal forces instead of pressure created with the plunger. That is, the device may have a generally circular footprint, with the main sample collection well 112 formed at the center of the device 100, and the sub-chambers formed at the outer perimeter of the device. After loading a specimen sample in the main sample collection well 112, the device 100 then may be rotated about a central axis that extends through the main sample collection well 112, such that the specimen experiences centrifugal forces splitting the specimen into the one or more internal microfluidic channels that connect the main sample collection 112 well to the sample chambers 108. Again, the device may include filters, such as membranes or gels, which separate the specimen into desired and undesired portions, with the desired portions passing into the sub-chambers. In another example, the sample specimen may be loaded into the main collection well through a re-sealable septum (e.g., on a bottom surface of the device in a similar location as the needle 302). For instance, the re-sealable septum may include a rubber seal that is pierced using a needle or pipette. The specimen then is injected into the main sample collection well. When the pipette or needle is withdrawn, the septum naturally re-seals the hole created by injection. Once the specimen is loaded into the main sample collection well, the specimen may be distributed to the sample chambers 108 using a vacuum force (e.g., created with the plunger such as the plunger 106 located on a top surface of the device opposite to the surface in which the septum is arranged or through a vacuum force stored within the device) or using centrifugal forces as described above.

Figure 4:
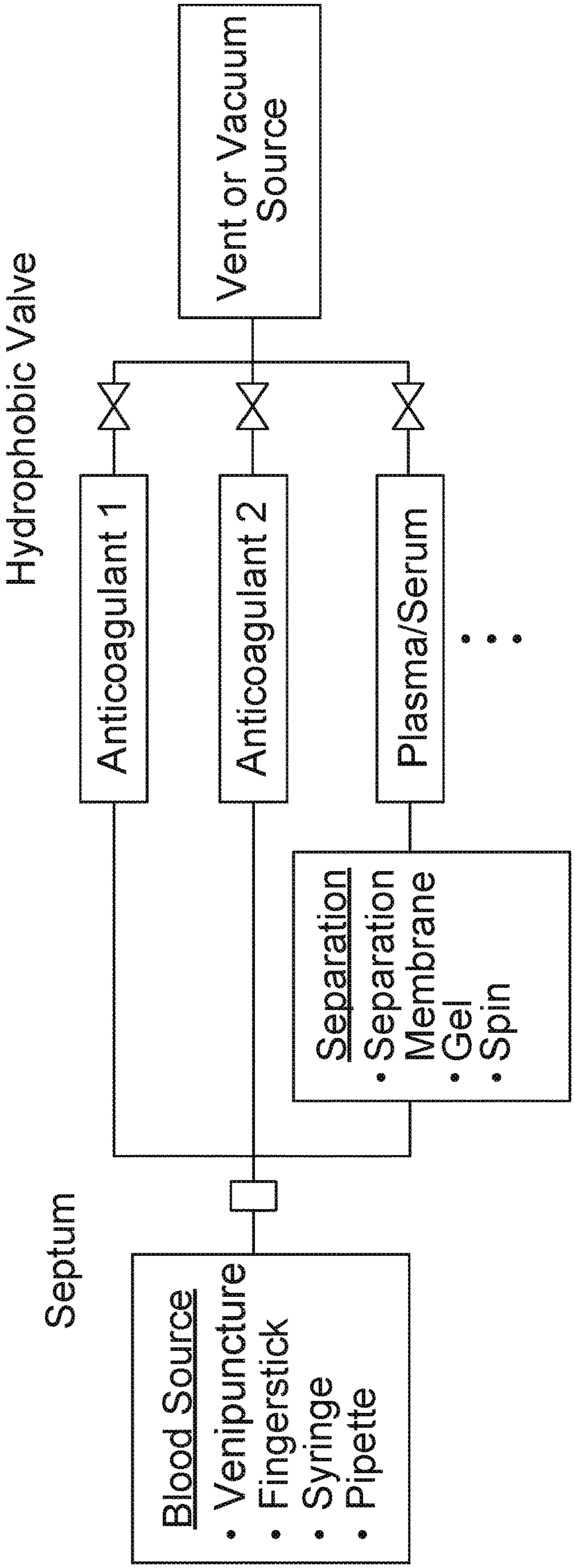
FIG. 4 is a flow chart that depicts a possible process flow for the sample acceptance device.

FIG. 4 is a schematic that illustrates an example of a flow chart that depicts the process flow for the sample acceptance device 100, as described above. The specimen sample (e.g., blood) is first introduced into the device 100. As noted above, the source of the blood specimen can include, for example, venipuncture, finger stick, syringe, or pipette. The blood specimen may be introduced through a re-sealable septum, by placing the specimen directly in a collection well accessed through a lid, or by withdrawing the blood specimen into the collection well using a vacuum, as previously described. Once in the device, the driving force (either positive or negative pressure) causes the blood specimen to flow down several microfluidic channels each of which ends in a corresponding sub-chamber containing a different reagent (e.g., anticoagulants). Some of the microfluidic channels contain in-line filters for separating plasma or serum. Hydrophobic valves, membranes or stops (described below) are located at the end of the sub-chambers to allow the sub-chambers of the device 100 to vent and, at the same time, to prevent the blood specimen from passing to outside of the device. Once each sample chamber is full, flow into the chamber stops.

Figure 5:
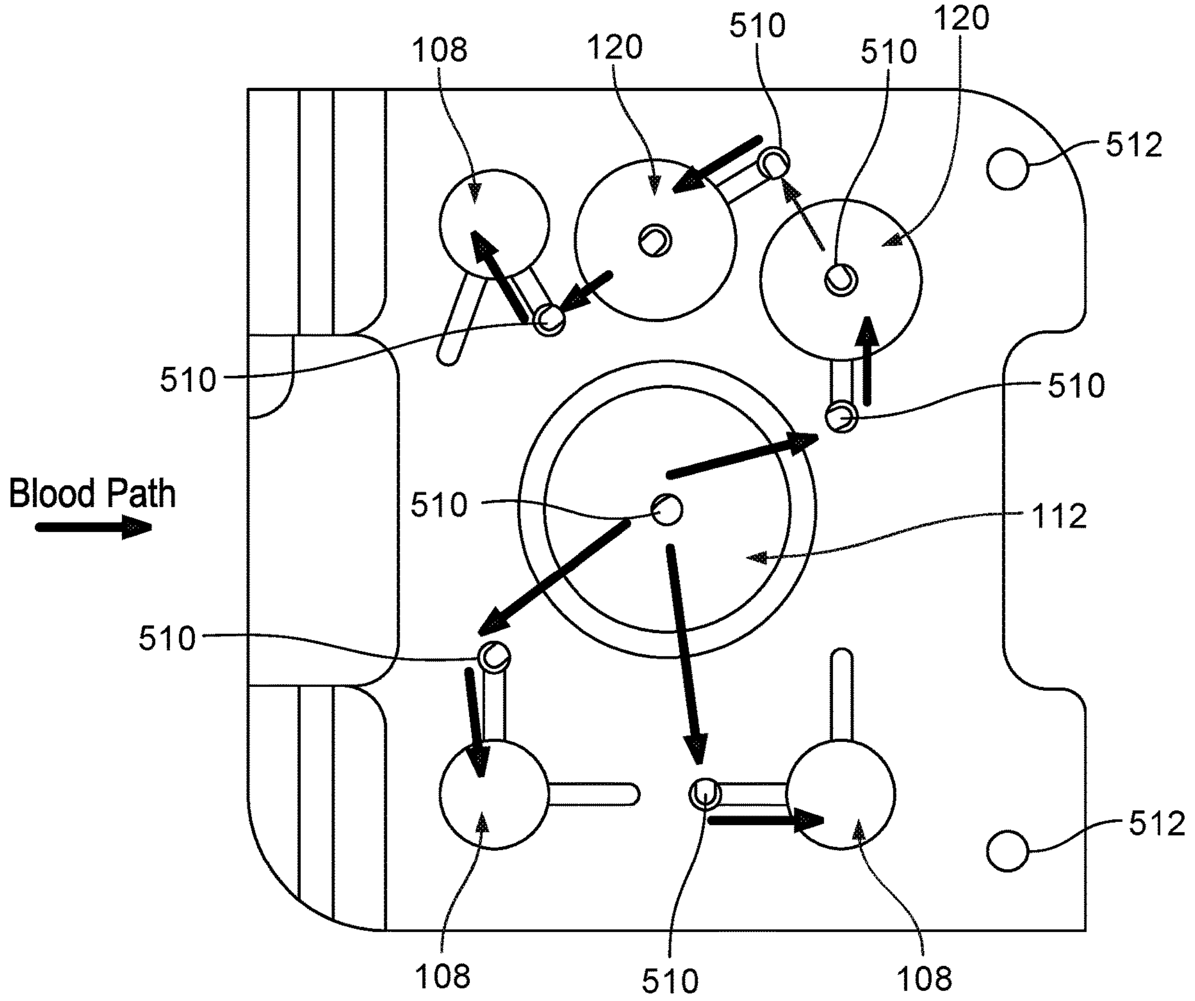
FIG. 5 is a schematic that illustrates a top view of an example of a sample acceptance device.

FIG. 5 is a schematic that illustrates a top view of an example of the device 100 shown in FIG. 1 with the lid removed. The light colored arrows in FIG. 5 indicate the pathways of a specimen (e.g., blood) from the main collection well 112 to the sample chambers 108. As shown in FIG. 5, the device 100 includes the main sample collection well 112 and three sample chambers 108 (plasma sample chamber, EDTA blood sample chamber, and Heparin blood sample chamber). Between the plasma sample chamber and the main sample collection well 112, the device 100 also includes one or more filter stacks 120 for separating the plasma from the blood before the plasma passes to the plasma sample chamber. A number of the microfluidic channels through which the blood specimen passes from the well 112 to the sample chambers 108 are formed within the body portion of the device 100 and are not shown in FIG. 5. FIG. 5 also shows several openings 510 formed in the device 100. The openings 510 correspond to fluidic channels through which the sample travels vertically through the device 100 (from the bottom to the top or vice versa, i.e., along a direction extending into and out of the plane of the page in which the device 100 is shown in FIG. 5) before or after being distributed by horizontal channels. The device 100 also includes other openings 512 that may serve as alignment holes for guiding alignment pins through the device 100 during assembly.

Figure 6A:
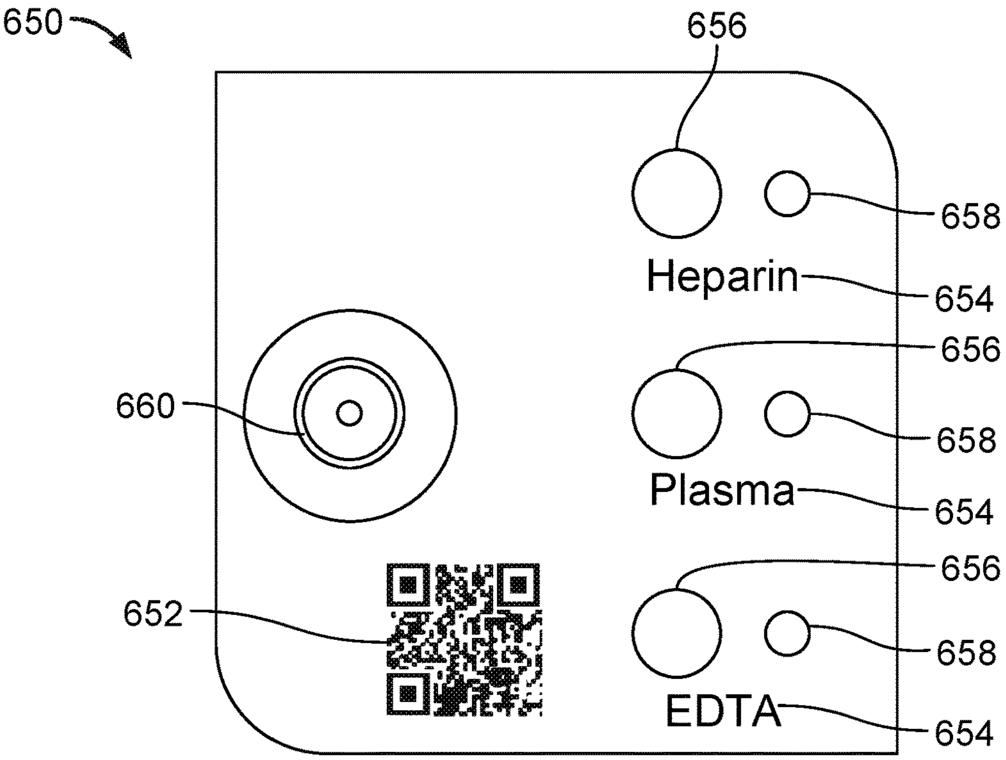
FIG. 6A is a schematic that illustrates a top view of a label for positioning on the top surface of a sample acceptance device.

FIG. 6A is a schematic that illustrates a top view of a label 650 for positioning on a surface of a sample acceptance device. The label 650 can include a machine readable code 652 (e.g., 1D or 2D bar code or an RFID chip) that encodes information about the type of sample and/or reagents used in the sample acceptance device. The label 650 also may include identifiers 654 that indicate to a user the different sample chambers of the device. The identifiers 654 may be printed or stamped on the label. Next to each identifier 654, the label 650 includes two circular regions (one large and one small). Each of the large circular regions 656 includes a seal (e.g., a foil) and is intended to cover a corresponding sample chamber. Each of the small circular regions 658 is a viewing window (e.g., glass or plastic) through which a user can view whether the corresponding chamber has been filled with the specimen sample. The label 650 also includes a circular region 660 corresponding to the main sample collection well. As shown in the example of FIG. 6A, the region 660 includes a re-sealable septum at its center into which a pipette or needle may be injected so as to deliver the specimen sample to the well.

Figure 6B:
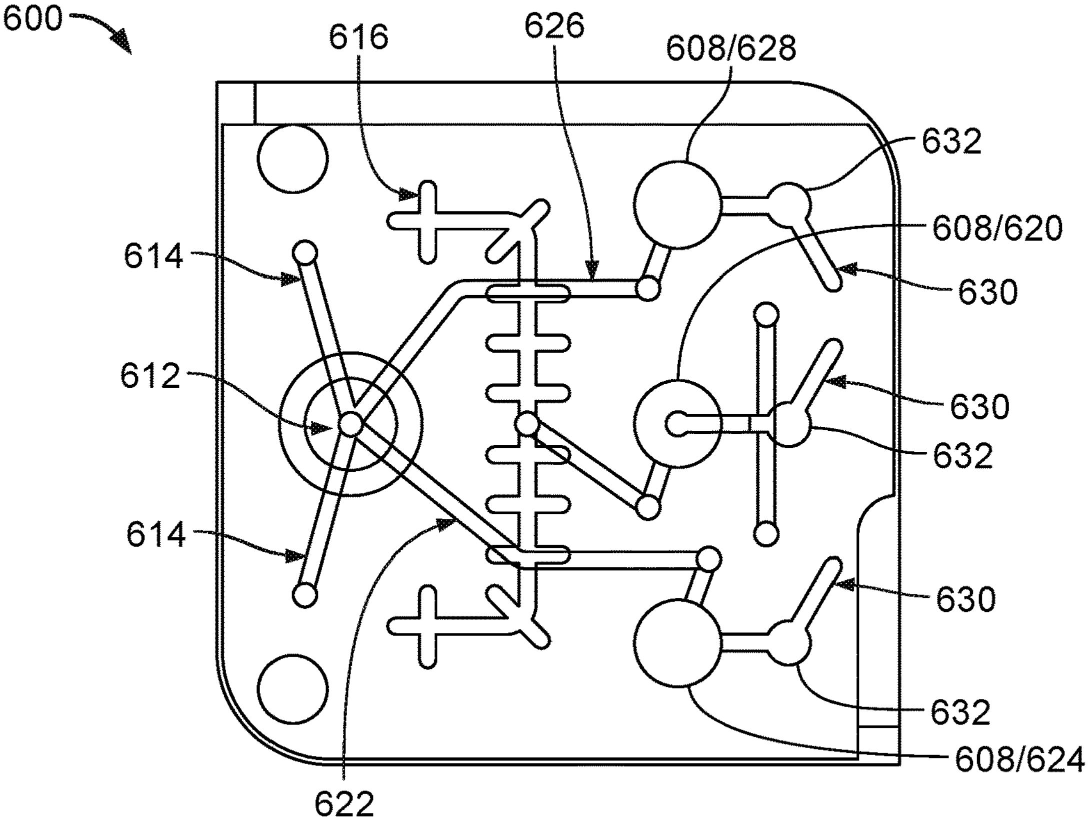
FIG. 6B is a schematic that illustrates a top view of a sample acceptance device.

FIG. 6B is a schematic that illustrates a top view of a sample acceptance device 600 to be used with the label 650 of FIG. 6A. To aid in the description of the device 600, the schematic of FIG. 6B also illustrates the different fluidic channel pathways from the main sample collection well. It should be noted that the fluidic channels depicted in FIG. 6B can be formed at different depths of the device 600 and therefore may not be visible in the manner shown in FIG. 6B in an actual device. Similar to device 100 shown in FIG. 1, device 600 also includes a main sample collection well 612 and three separate sample chambers 608 for storing a specimen (e.g., blood) received at the main sample collection well 612. During use, the specimen is introduced into the main sample collection well 612 through the re-sealable septum. The driving force (e.g., air pressure, vacuum, centrifugal) then causes the specimen to propagate through the fluidic channels to the different sample chamber 608. For instance, the specimen may propagate through channels 614 that lead to a blood separation membrane (not shown). From the blood separation membrane, the remaining specimen may propagate to the plasma collection channel 616, and from the plasma collection channel to the plasma chamber 620. The specimen may also propagate through channels 622 that lead to the EDTA chamber 624. The specimen may also propagate through channels 626 that lead to the heparin chamber 628. In some implementations, the device 600 also includes vents 630 coupled to each of chambers 620, 624, and 628, in which the vents 630 lead to corresponding hydrophobic valves, membranes or stops. As explained above, the hydrophobic stops allow air to pass from each chamber to outside of the device, but retain the specimen within the chambers. The device 600 may also include smaller chambers 632 that are aligned with the viewing windows of the label 650. A user can tell whether the sample specimen has finished filling the sample chambers by looking through the viewing windows to see if the smaller chambers 632 are full.

Figure 7:
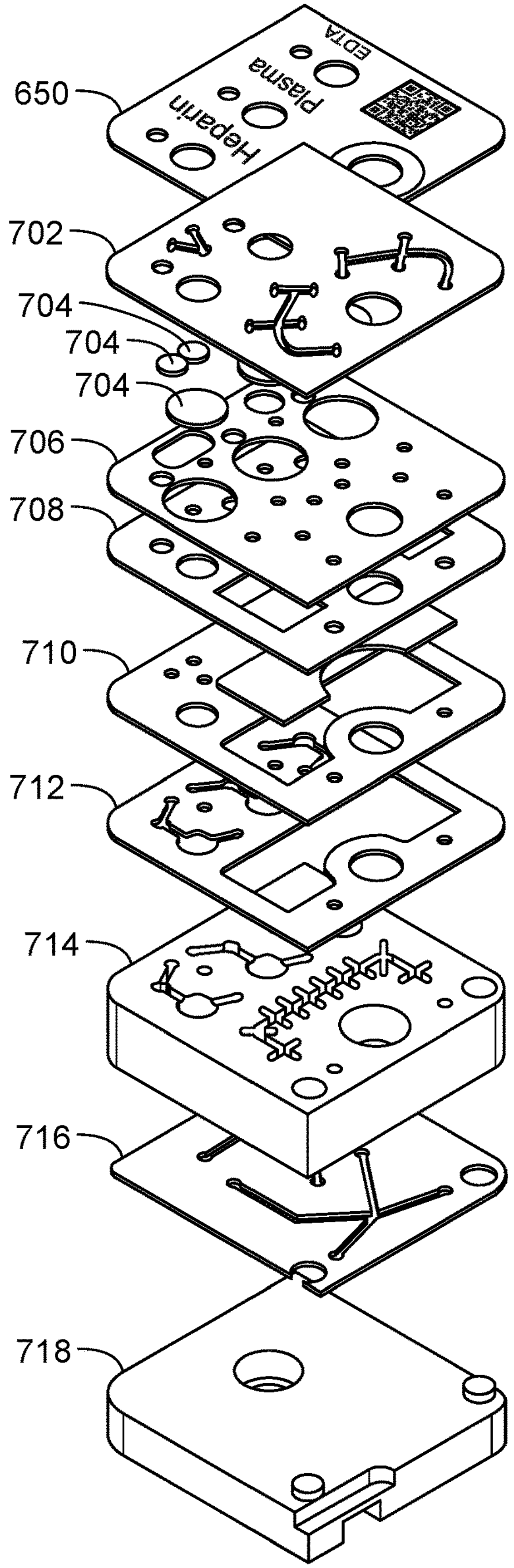
FIG. 7 is a schematic that illustrates an exploded view of the device shown in FIG. 6B.

FIG. 7 is a schematic that illustrates an exploded view of the device 600 in which the different layers that form the device 600 are shown. The top most layer is the label 650 that includes identifiers that indicate to a user the different sample chambers of the device and that may include a machine readable code. Beneath the label are positioned a stack of laminate layers to which the label 650 adheres. One or more of the laminate layers in the stack may be formed from a plastic material that is bio-compatible with the specimen sample. For example, for blood specimens, the laminate layers may be formed from a plastic material, such as polymethyl methacrylate (PMMA). Each laminate layer in the stack is configured to serve a different function, such that when the laminate layers are combined in the stack, they together are configured to allow the sample specimen to be transported from the main sample collection well, through the fluidic channels, to the sample chambers.

The first laminate layer 702 is designed to include openings that correspond to fluidic channels for distributing the sample specimen to a separation membrane, as well as openings that correspond to fluidic channels to vent air from the sample chambers. The second laminate layer 704 includes foil seals for sealing the top of the sample chambers. The foil seals may be formed from a material such as aluminum.

The second laminate layer 704 also may include hydrophobic valves or membranes that allow air to vent from the fluidic channels and chambers of the device when the sample chambers are filled with the specimen sample. The hydrophobic membranes may be formed from, for example, a porous polytetrafluoroethylene (PTFE) material such as the hydrophobic Aervent® membranes available from Millipore.

The third laminate layer 706 is configured to include access holes through which a user can access the sample specimen. When the device is fully assembled, the access holes are covered by the foil seals of layer 704.

The fourth laminate layer 708 includes an adhesive (e.g., a thin glue layer or adhesive tape) that seals around a perimeter of a top surface of the separation membrane.

The fifth laminate layer 710 includes the separation membrane, which is used, for blood specimens, to separate the plasma from the blood.

The sixth laminate layer 712 includes another adhesive layer (e.g., thin glue or adhesive tape) that seals around a perimeter of a bottom surface of the separation membrane. As shown in FIG. 7, the openings in each laminate layer extend through the entire thickness of the layer.

The laminate layers assemble into a stack and are affixed to a top surface of a main plate 714. The main plate 714 is a thick structure relative to the layers in the laminate stack. The main plate 714 also can be formed from a plastic, such as PMMA, or other material that is bio-compatible with the specimen sample. For example, the main plate 714 can be formed from glass. The main plate 714 includes the main sample acceptance well, the sample chambers, and the plasma collection channel. Each of the acceptance well, sample chambers and plasma collection channel extends through the thickness of the main plate 714. A bottom laminate layer 716 is positioned beneath the main plate 714 and includes specimen distribution channels for transporting the specimen between the chambers, the acceptance well and the plasma collection channel. Finally, an air vent/septum seat layer 718 is located at the bottom of the device. The septum seat layer 718 includes an opening that leads to a re-sealable septum or hydrophobic vent from which air can escape from the device or, using a vacuum, air can be withdrawn from the device. When fully assembled, the stack of laminate layers, the main plate 714, the bottom laminate layer 716, and the septum seat 718 may be secured together using, for example, screws that extend through each layer of the device. Alternatively, the layers may include an adhesive that allows each layer to be affixed to the next adjacent layer in the device.

Figure 8:
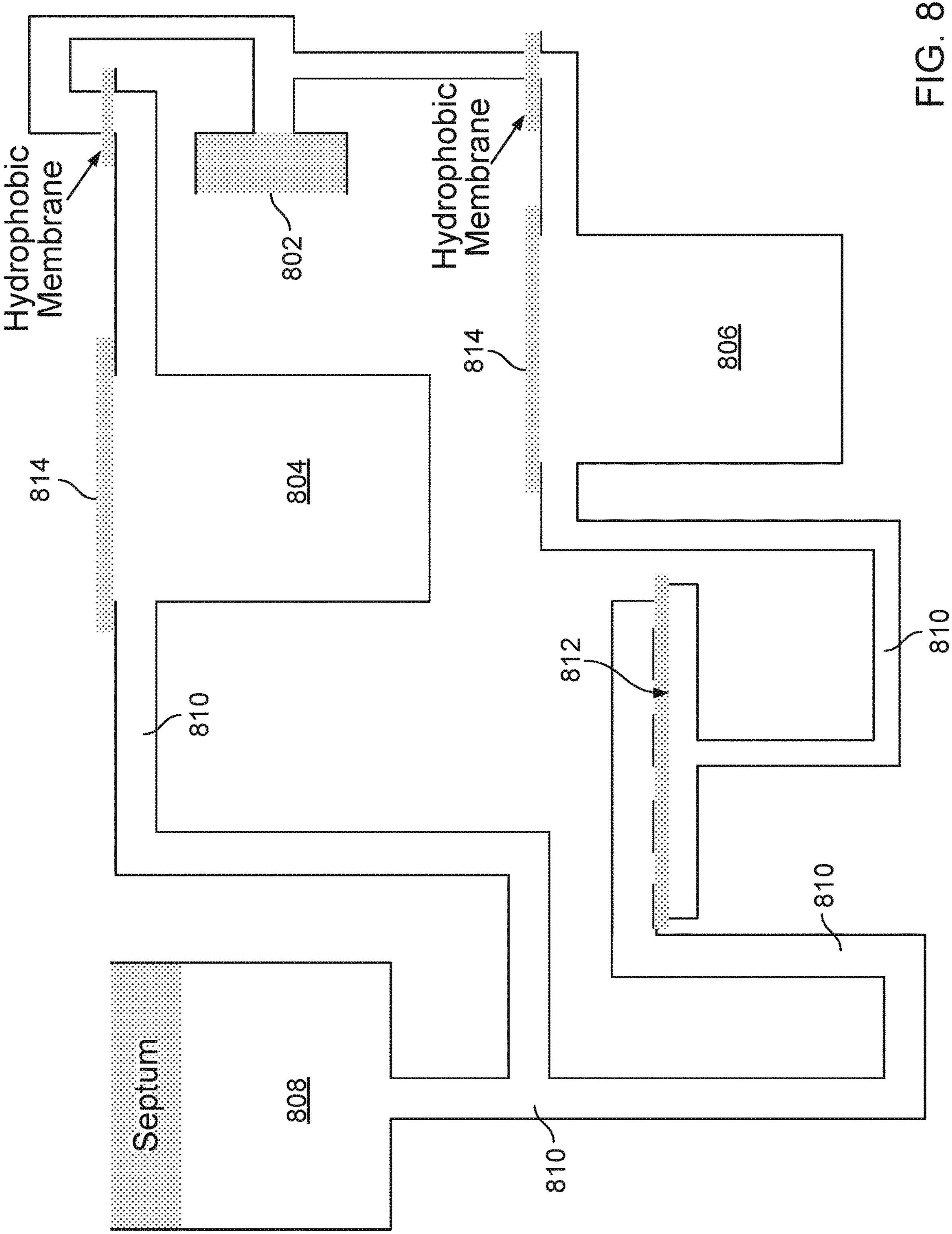
FIG. 8 is a schematic that illustrates a general flow path for a specimen added to a sample acceptance device.

FIG. 8 is a schematic that illustrates a general flow path for a specimen added to a sample acceptance device such as, e.g., the device shown in FIG. 3 or FIG. 6. In this particular example, actuation of the fluid is achieved by creating a vacuum. In particular, the device includes a vent covered by a re-sealable septum 802. A vacuum line is inserted into the re-sealable septum and, using the vacuum line, a low pressure region is generated on the side of the device near the sample chambers (shown in FIG. 8 as EDTA/heparin well 804 and plasma well 806). Upon creating the low pressure region, the sample specimen contained in the main sample acceptance well 808 is pulled into the microfluidic channels 810 toward the sample chambers 804/806. Prior to reaching the plasma sample chamber 806, the sample specimen passes through the plasma separation membrane 812, which separates the plasma from the rest of the blood. The plasma then continues flowing toward the sample chamber 806. Each of the sample chambers 804, 806 also include a foil seal 814 covering access holes to the chambers so that the samples remain isolated until it is time to perform analysis of the samples. As explained above, the samples may be accessed in the chambers by piercing the foil seals 814 using a needle or pipette tip.

In one example, the sample acceptance devices shown in FIGS. 1-3 and 5-7 may have a length and width between approximately 1 and 2 inches (as measured within the plane of the page in FIGS. 1 and 5-6) and a thickness (as measured into the page in FIGS. 1 and 5-6) of about 0.5 inches, though the sample device is not limited to those dimensions. Each of the main sample collection well and the sample chambers is designed to hold sample volumes between about 10 microliters and about 5 ml, e.g., between 50 microliters and 500 microliters, though other sample volumes may be used. The microfluidic channels that connect the main sample collection well and the sample chambers are typically designed to have a width (transverse to fluid propagation) between about 0.25 to 1 mm and a height (transverse to fluid propagation) between about 0.1 to 0.3 mm, though other sizes may be used.

The sample acceptance device is intended to provide a simple and low cost device for storing and keeping specimen samples stable until it is time to perform analysis, such as a hematology panel, a chemistry panel and/or an immunoassay panel, including, for example, a complete blood count (CBC), a basic metabolic panel (BMP) assay, a comprehensive metabolic panel (CMP) assay, a hepatic assay, an amylase/lipase assay, a cardiac assay, and/or a toxicology assay. Because the sample acquisition device does not include the reagents used in performing the sample analyses, it does not need to be kept refrigerated prior to use and can therefore be stored close to the patient/point-of-care.

Figure 9:
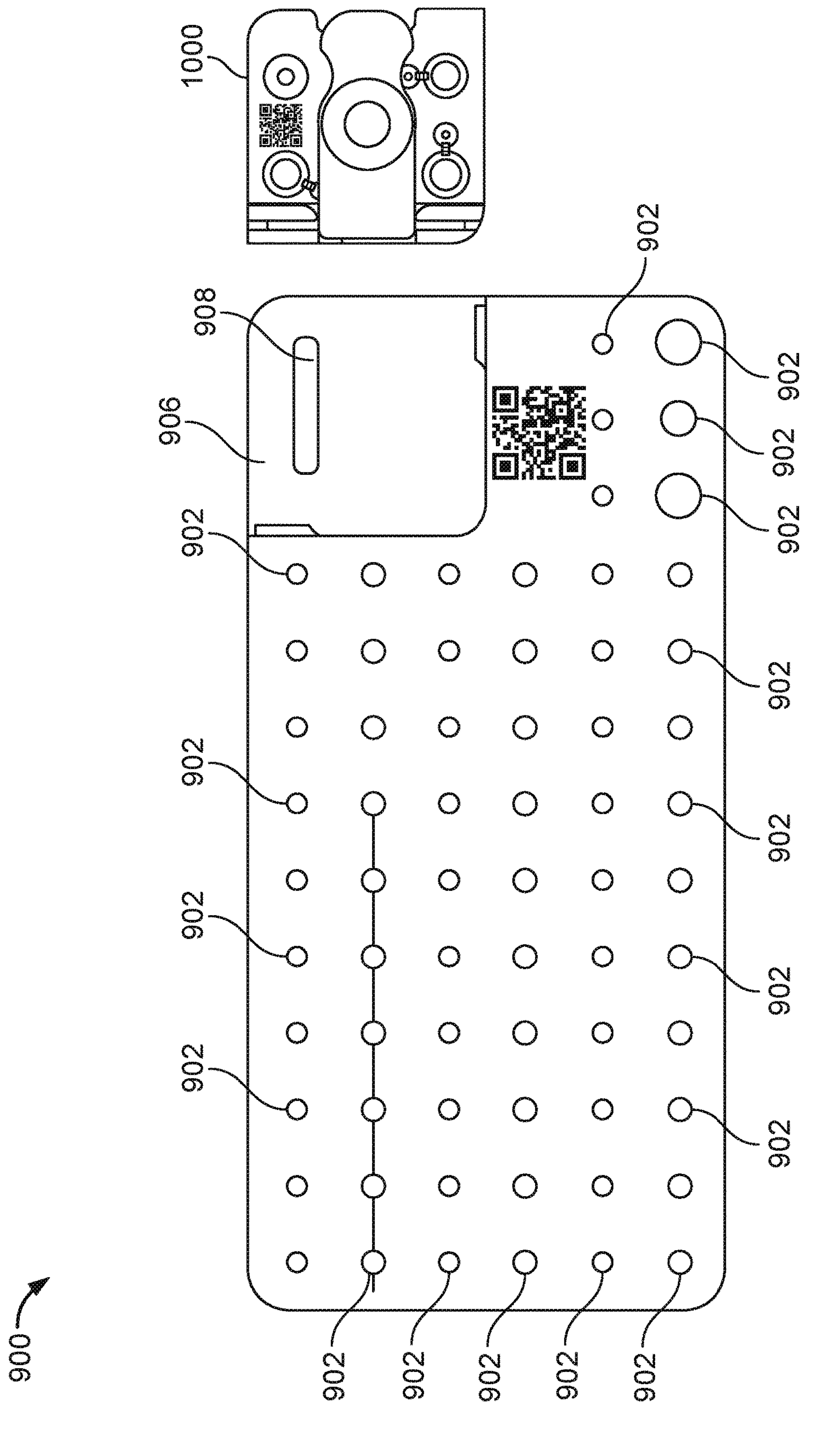
FIG. 9 is a schematic that illustrates a top view of an example of a disposable assay cartridge and a sample acceptance device.
Figure 10:
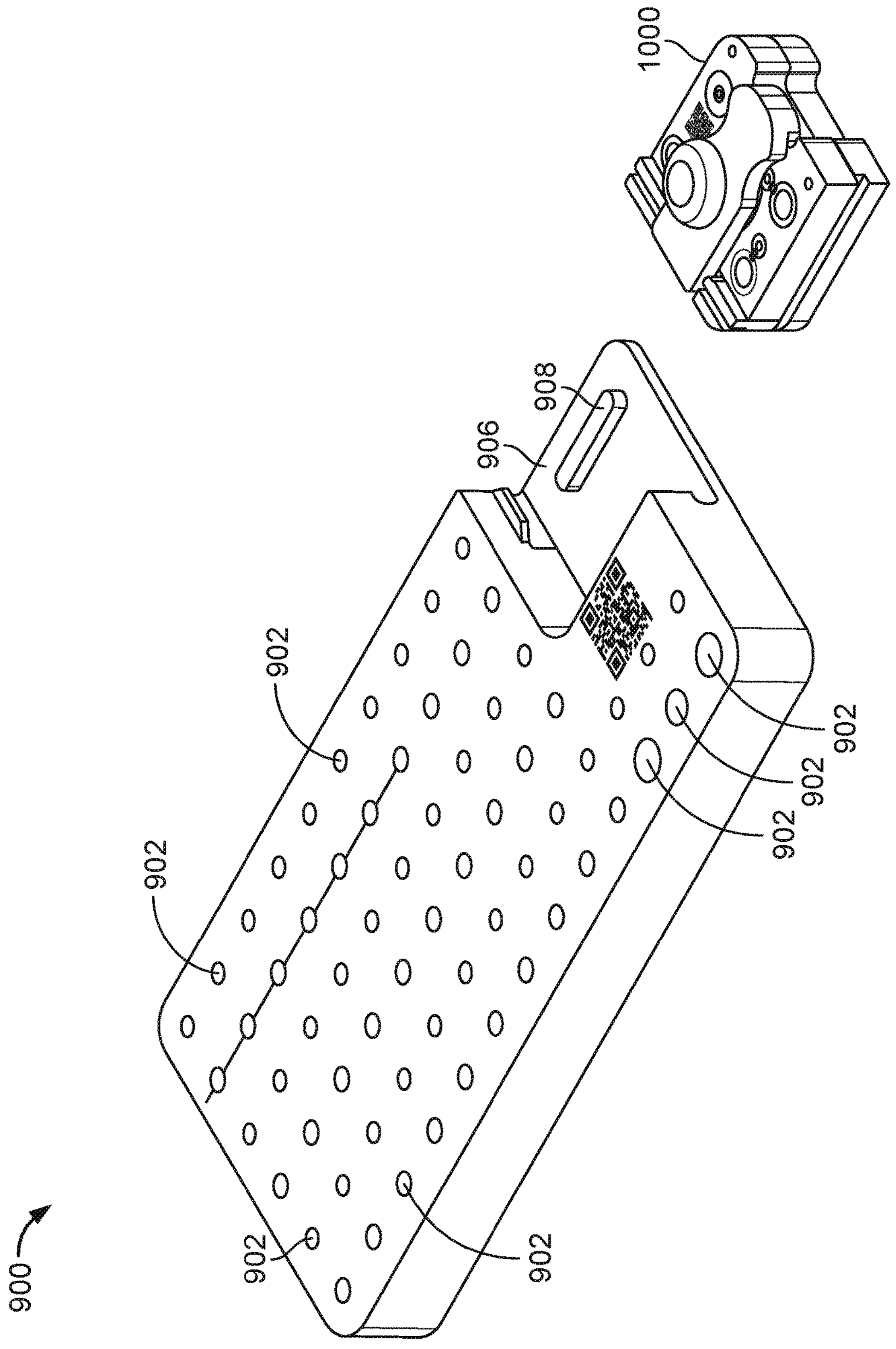
FIG. 10 is a schematic that illustrates a perspective view of an example of a disposable assay cartridge and a sample acceptance device.

FIGS. 9 and 10 are schematics that illustrate a top view and a perspective view, respectively of a disposable assay cartridge 900 and a sample acceptance device 1000 for attaching to the disposable assay cartridge 900. The device 1000 may include any of the sample acceptance device designs described herein. The disposable assay cartridge 900 defines that assay menu for the analyzer system into which the cartridge 900 will be delivered. In order to afford flexibility for assay process steps and sample types, the disposable cartridge 900 preferably accepts a wide variety of different sample types (i.e., different anti-coagulated specimens such as blood, serum/plasma, saliva, urine, among others). The disposable cartridge 900 also provides one or more regions for performing multiple reactions steps including incubations. Additionally, the cartridge 900 also provides flexibility in defining the assay menu so that multiple different configurations are possible using a single cartridge footprint. Furthermore, the ability to separate the cartridge 900 from the sample acceptance device 1000 allows the cartridge to be stored in a refrigerator if necessary while the sample acceptance device can be stored separately (e.g., closer to the patient bedside).

As shown in FIG. 9, the cartridge 900 includes multiple wells 902 in a well-plate format. For instance, the cartridge 900 may include, but is not limited to, at least 10 wells, at least 20 wells, at least 30 wells, at least 40 wells, at least 50 wells, at least 100 wells, at least 150 wells, at least 200 wells, up to and including 1000 wells. The wells 902 are used for storing reagents and/or performing reactions and incubations.

Figure 12:
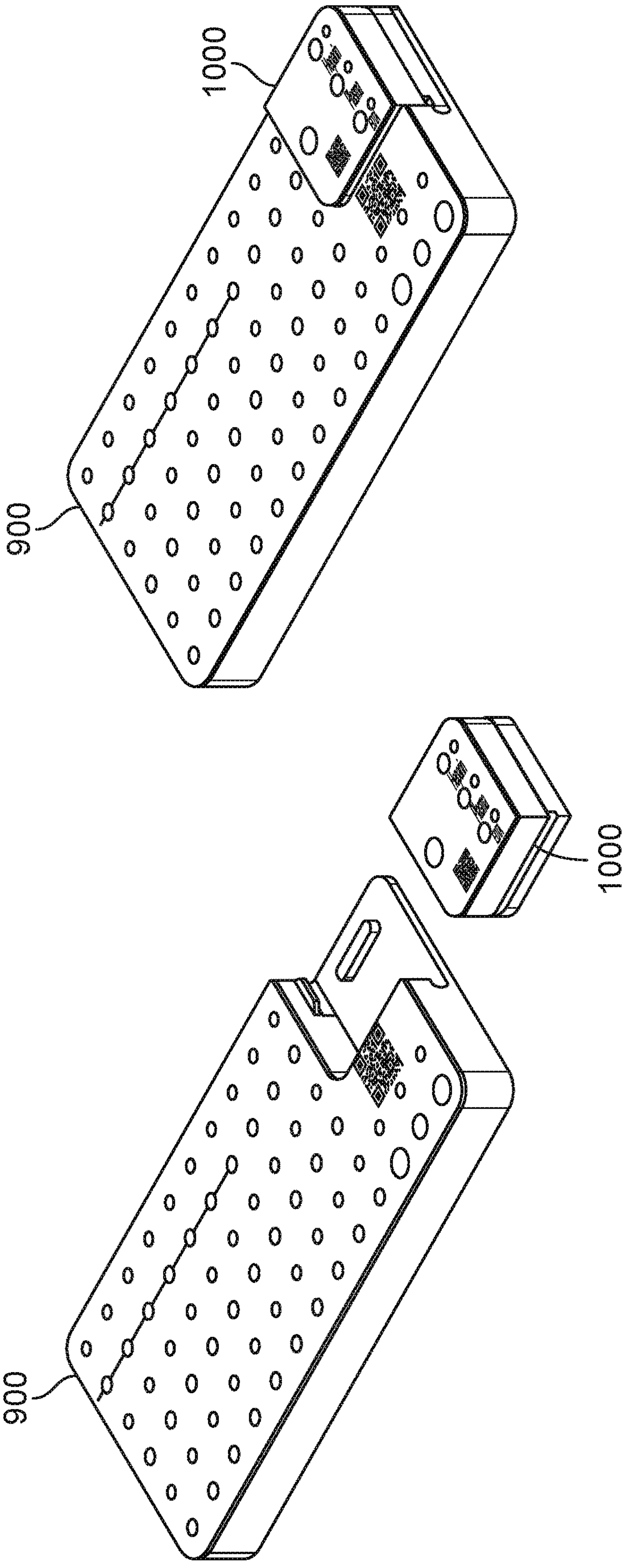
FIG. 12 is a schematic that illustrates an example of a disposable assay cartridge and a sample acceptance device prior to being attached and subsequent to attachment to one another.

The flexibility of the well-plate format allows the cartridge to interface with a pipetting system for delivery of the sample from the sample acquisition device 1000 to any one or more of the wells 902 of the cartridge 900. Before transferring portions of the sample specimen from the device 1000 to the wells 902 of the cartridge 900, the device 1000 can be secured to the cartridge 900. As explained above with respect to FIGS. 2 and 3, the cartridge 900 may include a receptacle region 906 for receiving the sample acquisition device 1000. In some implementations, the receptacle region 906 and device 1000 are designed so that the device 1000 snaps into place on the receptacle region 906 and is held securely to the cartridge 900. For instance, the receptacle region 906 and the device may be formed to have a tongue/groove design in which one or more protrusions (i.e., the tongue) formed on either the receptacle region 906 or the device 1000 fits into a corresponding slot or other opening (i.e., the groove) formed in the opposing device 1000 or the receptacle region 906, such that the two components (cartridge 900 and device 1000) lock in place together. In some implementations, the receptacle region 906 also may include a protrusion 908 that fits into a corresponding opening or groove in the main body portion of the device 1000, such that when the device 1000 is placed in the receptacle region 906, the device 1000 remains stable and does not shift. FIG. 12 is a schematic that illustrates an example of the cartridge 900 and device 1000 prior to being attached and subsequent to attachment to one another. Alternatively, as in the embodiment shown in FIG. 3, the receptacle region 906 may include a hole or other opening into which the needle shield is inserted, thus also functioning to prevent a shifting of the device 1000 relative to the cartridge 900.

Figure 11:
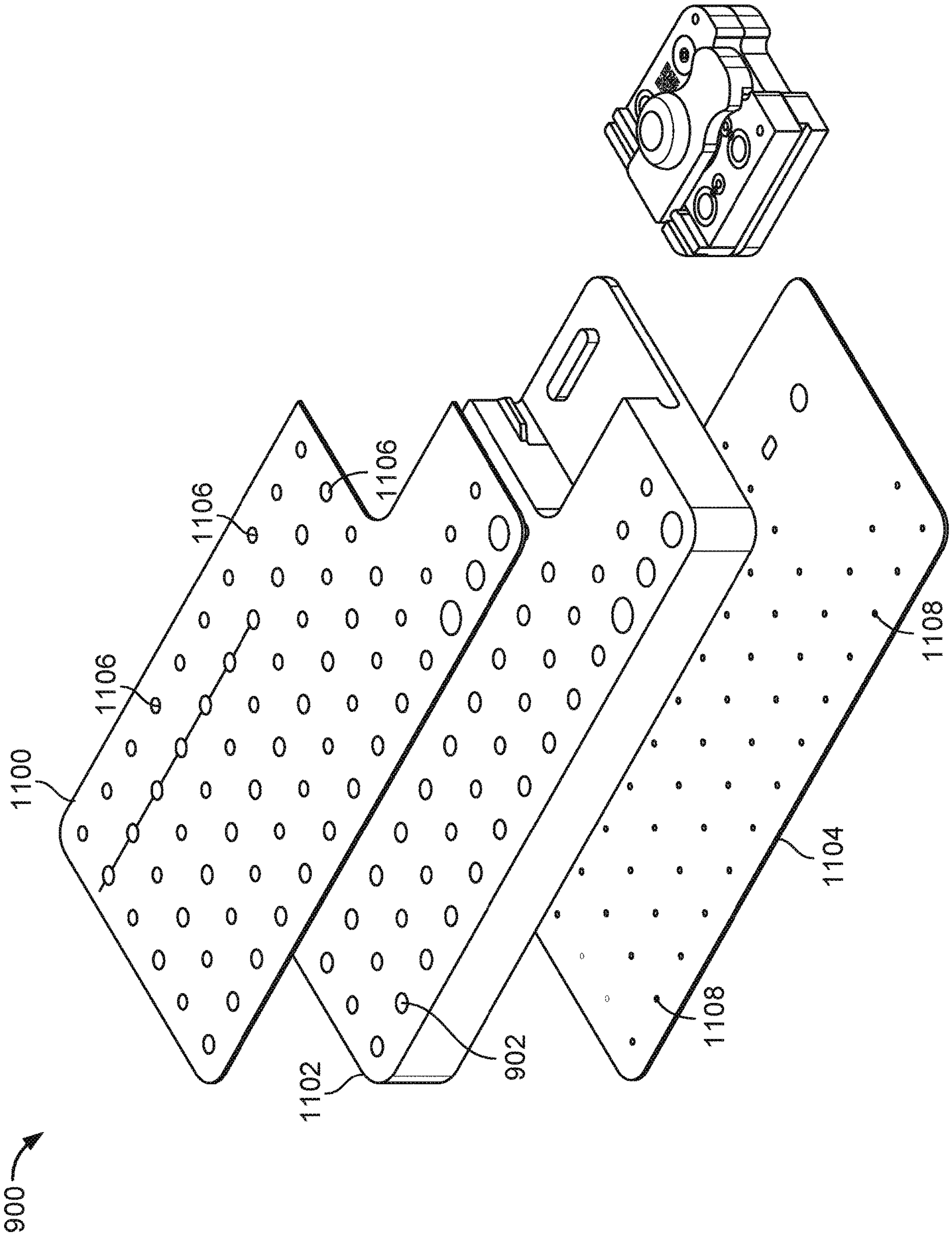
FIG. 11 is a schematic that illustrates an exploded view of an example of a disposable assay cartridge along with a sample acceptance device.

FIG. 11 is a schematic that illustrates an exploded view of the cartridge 900. As shown in FIG. 11, the cartridge includes a top layer 1100, a main body portion 1102 in which the wells 902 are formed, and a bottom layer 1104 that attaches to the bottom surface of the main body portion 1102. The top layer 1100 can include a foil laminate on which information helpful to the user may be printed. For instance, the foil laminate may include an indication of the type of assay panel for which the cartridge 900 may be used. The label may also include a machine readable code (e.g., bar code) that provides further information about the cartridge 900, such as the types of reagents includes in the wells and their corresponding locations on the cartridge 900. The top layer 100 may also include multiple circular access holes 1106 intended to be aligned with the wells 902 in the main body portion 1102. The foil covers over the access holes 1106 and is intended to keep the reagents in the wells isolated until it is time to deliver a portion of the sample to the wells.

The main body portion 1102 of the disposable cartridge 900 may be formed of a bio-compatible material, such as PMMA or glass, in which the wells 902 are formed. The depth of the wells 902 extends entirely through a thickness of the main body portion 1102. The wells 902 can be designed to hold different volumes of fluid including for example between about 10 and 500 microliters. The wells 902 may be designed to hold other volumes as well. Depending on the assays to be performed, the wells may be pre-loaded with one or more different reagents. For example, the wells may be pre-loaded with one or more of a hemoglobin reagent, a glucose reagent, an alkaline phosphatase (ALP) reagent, a white blood cell reagent, a red blood cell reagent, a platelet (PLT) reagent, or a basophil (BASO) reagent. Other reagents may be used as well.

Examples of the different assay panels for which the cartridges may be designed include, but are not limited to, comprises a complete blood count (CBC) assay, a basic metabolic panel (BMP) assay, a comprehensive metabolic panel (CMP) assay, a hepatic assay, an amylase/lipase assay, a cardiac assay, a toxicology assay, among others.

The bottom layer 1104 includes a laminate film (e.g., plastic) with multiple access holes 1108 that are covered in foil to contain the reagents until it is time to remove the product from the wells 902. The top layer 1100, the main body portion 1102, and the bottom layer 1104 may be assembled together using, for example, screws or adhesives. A fully assembled cartridge may have, for example, the following overall dimensions: a width of between about 2 to 4 inches, a length of between about 4 to 10 inches, and a thickness of between about 0.25-0.75 inches. Other dimensions may be used as well.

In some implementations, the cartridge 900 can be formed in a modular manner. That is, the cartridge 900 can be made up of multiple sub-cartridges that are snapped together either by the user or during assembly. The sub-cartridges each contain different panels of assays (i.e., each section may include wells containing different reagents depending on the assay panel to be performed) so that when they are combined the final cartridge contains multiple panels of tests. For instance, a comprehensive metabolic panel (CMP) sub-cartridge could be snapped together with a complete blood count (CBC) sub-cartridge to produce a finished well-plate cartridge. Alternatively, the sub-cartridge could be replaced with a Cardiac Event sub-cartridge to create a different panel of assays.

Figure 13:
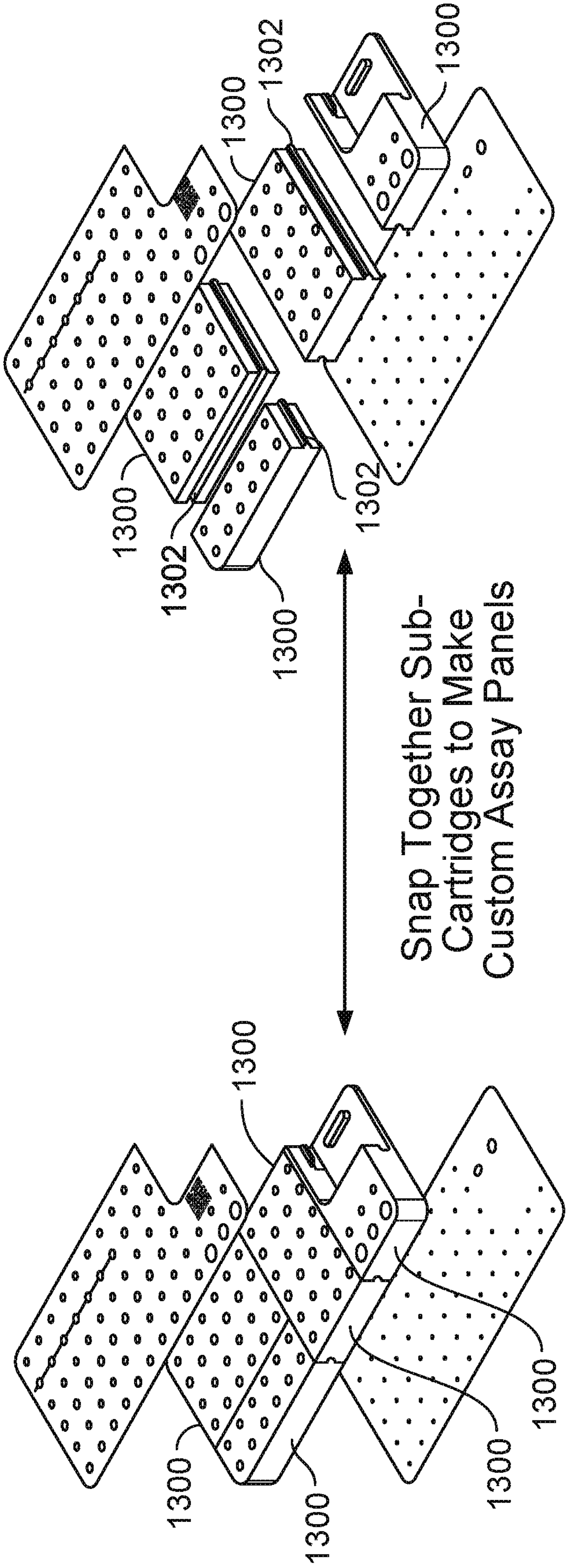
FIG. 13 is a schematic that illustrates an exploded view of a modular cartridge in which the sub-cartridges are snapped together and where the sub-cartridges are separated from one another.

FIG. 13 is a schematic that illustrates an exploded view of a modular cartridge in which the sub-cartridges 1300 are snapped together and where the sub-cartridges 1300 are separated from one another. Similar to the sample acceptance device, the sub-cartridges 1300 may have on their sides a tongue/groove or tab/slot design 1302 that allows the pieces to lock in place to one another.

Figure 14:
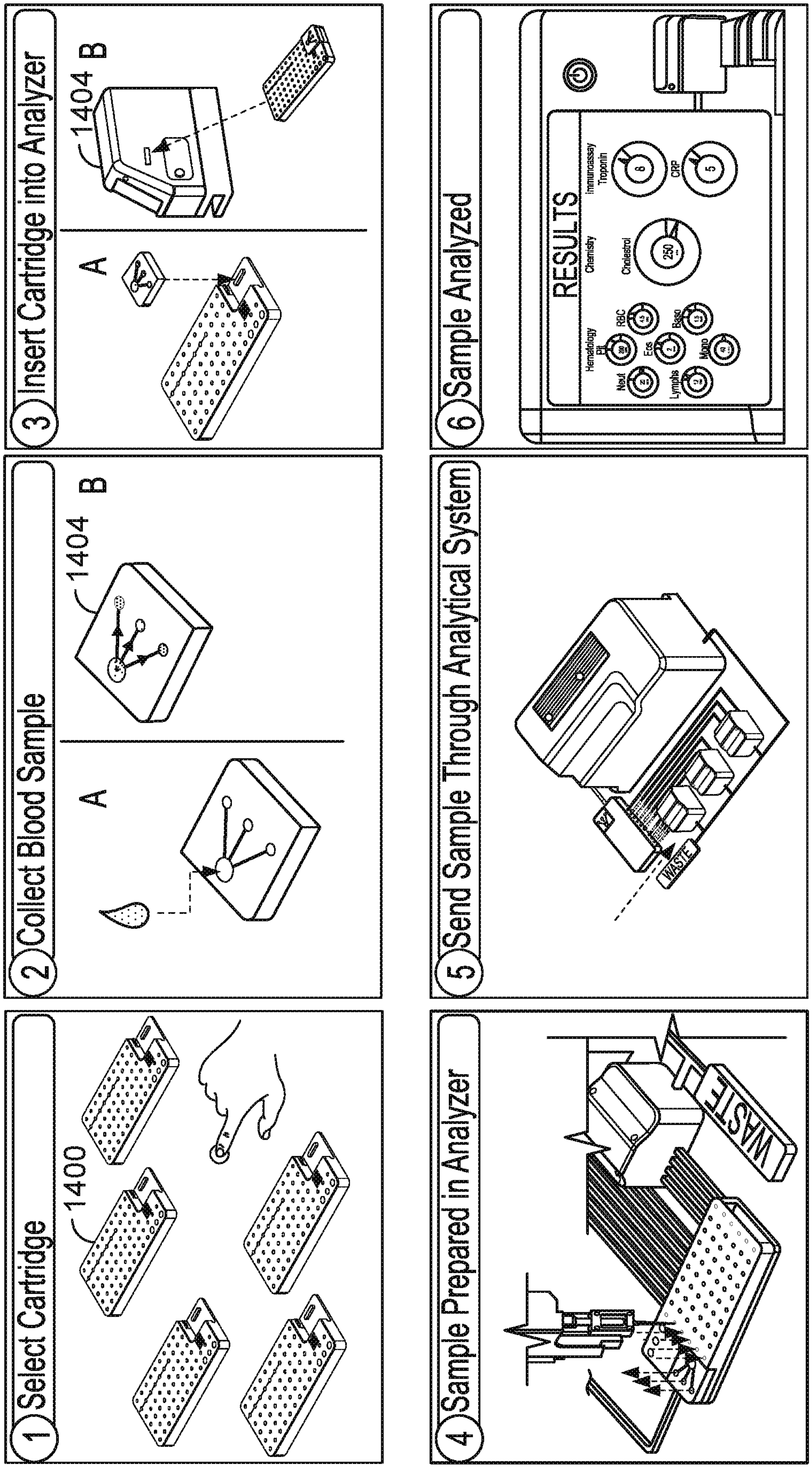
FIG. 14 is a schematic that illustrates an overall process for collecting a specimen sample using a sample acceptance device, transferring the sample from the device to a disposable assay cartridge and analyzing results of reactions performed on the assay cartridge.

Once the proper cartridge has been selected for the desired assay panel(s) and the cartridge and sample acceptance device have been attached to one another, the combined cartridge and sample acceptance device is delivered to a sample analyzer, which transfers portions of the sample from the sample acceptance device to the wells in the cartridge, and then analyzes the chemical reactions and products that form. FIG. 14 is a schematic that illustrates the overall process. In a first step (top left figure), a user selects a cartridge 1400 that includes the desired assay panel to be performed. Then, the sample specimen (e.g., blood) is collected and transferred to the sample acceptance device 1402 (top middle figure), where the specimen may be temporarily stored, and in some cases, separated using filters/membranes. Following collection of the specimen, the sample acceptance device is attached to the selected cartridge and the combined device is inserted into the sample analyzer system 1404 (top right figure). The analyzer 1404 then transfers portions of the specimen from the sample acceptance device into one or more of the wells of the cartridge (bottom left figure).

The analyzer system 1404 may perform this transfer automatically using an automated pipetting system, where a needle or pipette punctures the seals on the chambers in the sample acceptance device and withdraws a defined aliquot of the specimen. The needle or pipette then is repositioned over a well in the cartridge, where the needle or pipette subsequently punctures the seal covering the reagent in the well and delivers the specimen. Once the time for the desired reaction has elapsed, the analyzer system may extract any product or resulting fluid sample from the wells to which the specimen had been transferred. The samples are extracted on the bottom side of the cartridge (opposite to the side in which the specimen was introduced into the wells), again using a needle or pipette, that pierces the foil isolating the samples. The retrieved samples are sent through the analyzer system, which includes an electronic processor for subsequently performing one or more measurements on the obtained samples (bottom middle figure). The measurements may include photometric measurements, such as those described in WO 2014/078785, the entire disclosure of which is incorporated herein by reference in its entirety.

Alternatively, or in addition, the measurements may include cytometric measurements (e.g., cell counting or phenotyping), immune-assays (e.g., ELISA), and/or electrochemical measurements. The analyzer system 1404 may be configured to read the machine readable code located on the sample acceptance device and the disposable cartridge (e.g., on labels on the device and cartridge) such that the analyzer system can automatically determine what specimens are provided in the acceptance device, to which wells of the cartridge the specimens need to be transferred, the volume of the specimen that needs to be transferred, and the tests to be performed for the desired assay panel. The output of the analysis may then be delivered to a user, e.g., using an electronic display and/or may be stored in memory of the analyzer system (see bottom right figure).

As explained above, however, the cartridge and sample acceptor device to not necessarily need to be coupled together when provided to the analyzer system. For example, in some implementations, the analyzer system may include separate receptacles or openings in different regions of the analyzer system for receiving the cartridge and the sample acceptor device. The analyzer 1404 may still function in the same manner as described herein, in which the analyzer 1404 may automatically transfer portions of the specimen from the sample acceptance device into one or more of the wells of the cartridge, extract any product or resulting fluid sample from the wells to which the specimen had been transferred, and subsequently perform one or more measurements on the obtained samples.

In general, any of the analysis methods described herein in the analyzer system, including determining information about a specimen sample based on the products and/or reactions of the sample with reagents in the disposable cartridge, can be implemented in computer hardware or software, or a combination of both. For example, in some embodiments, the electronic processors can be installed in a computer as part of an analyzer systems and can be configured to perform analysis of measurements performed on the specimen samples. The analyses can be implemented in computer programs using standard programming techniques following the methods described herein. Program code is applied to input data (e.g., voltages from photo-sensors or currents from electrodes of the analyzer system) to perform the analysis and generate output information (e.g., slopes of voltage/current vs. time, peak voltage or current amplitude and widths, cell counts, and blood chemistry levels such as glucose, protein, bilirubin levels, among others). The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a tangible storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis methods can also be implemented as a tangible computer-readable storage medium, configured with a computer program, where the storage medium so configured causes a computer to operate in a specific and predefined manner to perform the functions described herein.

Other Embodiments

A number of embodiments have been described. Nevertheless, it will be understood that various modifications may be made without departing from the spirit and scope of the invention. Other embodiments are within the scope of the following claims.

What is claimed is:

1. An apparatus for use with a specimen analysis system, the apparatus comprising:

at least one well-plate, the at least one well-plate comprising a plurality of wells; and a sample acceptance device removably attachable to the at least one well-plate, wherein the sample acceptance device comprises a main body, a sample acceptance well in the main body, a plurality of storage chambers in the main body and arranged around the sample acceptance well, wherein each storage chamber is accessible from an exterior of the main body through a seal, a plurality of fluidic channels extending outwardly from the sample acceptance well through the main body and allowing fluidic coupling of the sample acceptance well to the plurality of storage chambers, wherein, when the at least one well-plate and the sample acceptance device are attached, each well-plate, of the at least one well-plate, comprises a corresponding well-plate surface at which wells of the well-plate are pipette-accessible and the sample acceptance device comprises a sample acceptance surface at which the plurality of storage chambers are pipette-accessible, and when the at least one well-plate and the sample acceptance device are attached, the corresponding well-plate surfaces at which wells of the well-plate are pipette-accessible and the sample acceptance surface at which the plurality of storage chambers are pipette-accessible extend along a common plane.

2. The apparatus of claim 1, wherein the at least one well-plate and the sample acceptance device are combined into a cartridge for use with the specimen analysis system.

3. The apparatus of claim 2 further comprising at least one encoder element configured to be read by the specimen analysis system, the at least one encoder element encoding information about fluid samples stored in the sample acceptance device, reagents stored in the at least one well-plate, an assay to be performed using the cartridge, volumes of fluid samples to be transferred among the apparatus, the plurality of wells of the at least one well-plate into which fluid samples are to be transferred, or combinations thereof.

4. The apparatus of claim 1, wherein each well of the plurality of wells is covered by a corresponding foil laminate that seals the well.

5. The apparatus of claim 1, further comprising a bottom layer, wherein the at least one well-plate and the sample acceptance device are on the bottom layer to provide a cartridge for use with the specimen analysis system.

6. The apparatus of claim 5, wherein the bottom layer and the at least one well-plate are attached to one another.

7. The apparatus of claim 5, wherein the at least one well-plate is attached to the bottom layer through a fastener or adhesive.

8. The apparatus of claim 1, wherein the sample acceptance device is configured to interlock with the at least one well-plate.

9. The apparatus of claim 1 comprising a needle fluidically coupled to the sample acceptance well.

10. The apparatus of claim 1, wherein the sample acceptance device is configured to transfer fluid from the sample acceptance well through the plurality of fluidic channels to the plurality of storage chambers upon application of a pneumatic pressure to the sample acceptance well.

11. The apparatus of claim 1, wherein the apparatus comprises two well-plates, and a first well-plate is loaded with a first assay panel and a second well-plate is loaded with a second assay panel different from the first assay panel.

12. The apparatus of claim 1, wherein each of the sample acceptance well and the plurality of storage chambers are fluidically isolated from the plurality of wells of the at least one well-plate.

13. An apparatus for use with a specimen analysis system, the apparatus comprising:

a plurality of removable modular well-plates; and a removable sample acceptance device removably attachable to the plurality of removable modular well-plates, the sample acceptance device comprising a sample acceptance well, a plurality of storage chambers, and a plurality of fluidic channels coupling the sample acceptance well to the plurality of storage chambers, respectively, wherein, when the plurality of removable modular well-plates and the removable sample acceptance device are attached, each removable modular well-plate, of the plurality of removable modular well-plates, comprises a corresponding well-plate surface at which wells of the modular well-plate are pipette-accessible and the removable sample acceptance device comprises a sample acceptance surface at which the plurality of storage chambers are pipette-accessible, and wherein, when the plurality of removable modular well-plates and the removable sample acceptance device are attached, the corresponding well-plate surfaces at which wells of the modular well-plate are pipette-accessible and the sample acceptance surface at which the plurality of storage chambers are pipette-accessible extend along a common plane.

14. The apparatus of claim 13 comprising a bottom layer, wherein the plurality of removable modular well-plates and the sample acceptance device are on the bottom layer to provide a cartridge for use with the specimen analysis system.

15. The apparatus of claim 14, wherein the bottom layer and the plurality of removable modular well-plates are attached to one another.

16. The apparatus of claim 14, wherein the plurality of removable modular well-plates are attached to the bottom layer through a fastener or adhesive.

17. The apparatus of claim 15, wherein the plurality of removable modular well-plates are configured to interlock with one another.

18. The apparatus of claim 17, wherein the removable sample acceptance device is configured to interlock with one or more of the plurality of removable modular well-plates.

19. The apparatus of claim 13, wherein each well-plate of the plurality of well-plates is fluidically isolated from one another.

20. The apparatus of claim 13, wherein at least two well-plates of the plurality of well-plates have different sizes.

21. The apparatus of claim 13, wherein at least two well-plates of the plurality of well-plates are loaded with different assay panels.

22. The apparatus of claim 13, wherein one or more wells of at least one well-plate is sealed by a corresponding foil laminate.

23. The apparatus of claim 13 comprising a needle fluidically coupled to the sample acceptance well.

24. The apparatus of claim 13, wherein the sample acceptance device is configured to transfer fluid from the sample acceptance well through the plurality of fluidic channels to the plurality of storage chambers upon application of a pneumatic pressure to the sample acceptance device or application of a vacuum to the sample acceptance device.

25. The apparatus of claim 13, wherein each of the sample acceptance well and the plurality of storage chambers are fluidically isolated from the plurality of wells of at least one well-plate.

* * * * *